Nov. 4, 1958

H. MOHR ET AL 2,858,859

HEATING APPARATUS FOR GRANULATED MATERIALS
WITH COMBINED REFILLING AND
DISPENSING MEANS

Filed June 25, 1957

Inventors:
HORST MOHR
WILLI LEPTIEN
By Toulmin & Toulmin
Attorneys

United States Patent Office 2,858,859
Patented Nov. 4, 1958

2,858,859

HEATING APPARATUS FOR GRANULATED MATERIALS WITH COMBINED REFILLING AND DISPENSING MEANS

Horst Mohr and Willi Leptien, Nortorf, Germany, assignors to Teldec Telefunken-Decca Schallplatten G. m. b. H., Hamburg, Germany Application June 25, 1957, Serial No. 667,941

Claims priority, application Germany June 25, 1956

8 Claims. (Cl. 141—82)

The present invention relates to a heating apparatus for granulated materials, and especially for granulated plastic materials for the manufacture of phonograph discs. More in particular, the present invention relates to an improved heating apparatus of the nature referred to with combined means for refilling the heating apparatus with the granulated material and dispensing the heated material from the apparatus.

The apparatus of the present invention is based upon and constitutes an improvement of the "Heating Device for Granulated Materials" which is the subject of the pending patent application Serial No. 639,400 filed February 11, 1957 and assigned to the same assignee as this application.

The heating device described in the pending patent application supra comprises a vertically disposed, preferably tubular oven containing a number of cups receiving the granulated materials. A stream of gas passes through the oven and heats the granulated material. By the actuation of lever means, the cups filled with granulated material and resting upon a platform below the oven are entered into the interior of the oven and thereby simultaneously the uppermost cups containing the sufficiently heated granulated material are pushed out of the oven. It is obvious, that the preparation of granulated material for processing in the oven still requires a number of operations, such as the filling of cups with granulated material prior to their introduction into the oven.

Having the foregoing in mind, it is the object of the present invention to provide for an improved heating apparatus for granulated materials—particularly for the manufacture of phonograph discs—which operates in a more economical and efficient manner by reducing the number of movements, to be performed by the operator.

This object is achieved by providing a heating apparatus of the nature referred to with a device for dispensing specified dosages of granulated material and by further equipping this combined heating and dosage dispensing unit with common lever means actuating both the dispensing device and the cup means of the heating device proper. By moving these lever means, for instance manually, the cup means are filled with the requisite amount of granulated material from the dispensing unit, and simultaneously therewith the filled cups are introduced into the oven to be heated therein and those cups already containing sufficiently heated granulated material are ejected from the oven, thus releasing the sufficiently heated material for further processing.

Whereas the dispensing process on the one hand, and the stocking of the oven with filled cups as well as the release of the cups after heating the material contained therein, on the other hand, were done separately and independently from each other and hence required at least two separate and independent movements, the apparatus of the present invention requires but one single actuation of the common lever means and hence one single movement in order to bring about the aforementioned processes.

The invention will be more fully appreciated upon the following detailed description of the accompanying drawings, in which Figure 1 is a partially sectional front view of the apparatus according to the invention;

Figure 1:
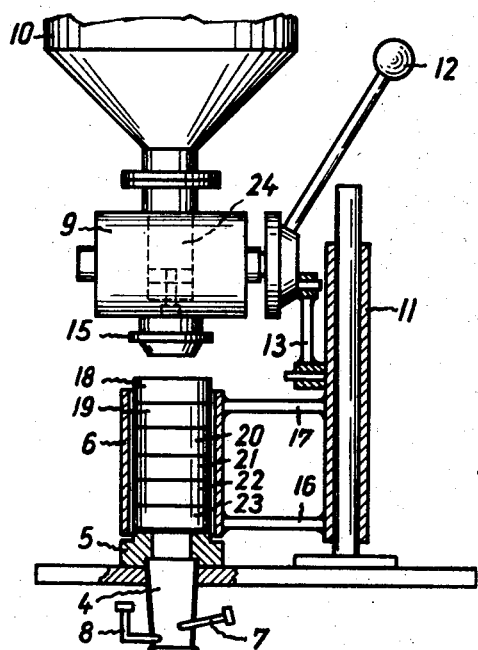
Figure 2:
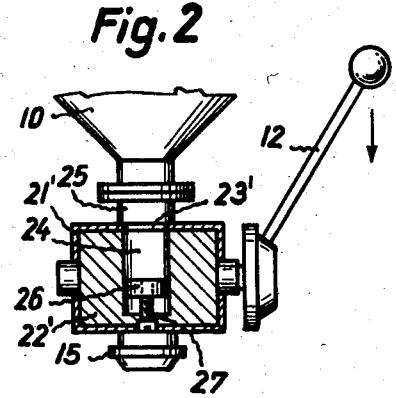
Figure 2 is a partially sectional front view of the dispensing and dosage controlling device of the apparatus according to the invention and shows the position in which the device is refilled.
Figure 3:
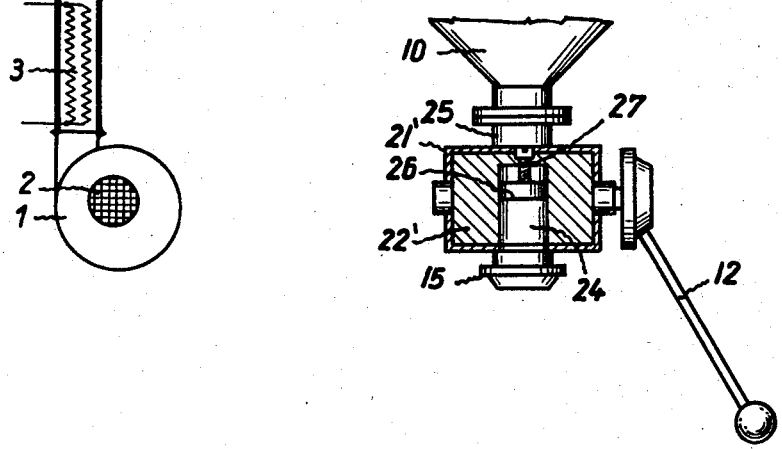
Figure 3 is a partially sectional front view of the dispensing and dosage controlling device of the apparatus according to the invention and shows the dispensing position of the device.

Referring now to the drawings somewhat more in detail, the fan 1 suctions in air through a screen filter 2 and blows the air into an electrically heated tube 3 in which the air is preheated. The temperature of the air is controlled by a thermometer 8 and regulated by a thermostat 7 regulating the electrical heating means in a known manner. At its upper end, tube 3 terminates in the lower end of an intermediate conically shaped tube 4 at the upper end of which there is mounted a sealing means 5. On the upper end of the sealing means 5 there is placed the tubular oven 6 enclosing, for instance, the cups 18, 19, 20, 21, 22, and 23 which are placed one above the other and each containing the requisite quantity of granulated material. As the lowermost cup 23 rests upon the upper plane of the sealing means 5 and as all cups 18 to 23 are provided with slots in their respective bottom area, the stream of hot gas or air propelled by fan 1, heated in tube 3, and controlled by thermostat 7 and thermometer 8, is allowed to enter the various cups through the slots at the bottom of each cup. The stream of hot gas or air thus passes through every cup and contacts the granulated material within the latter.

The storage container 10 is provided with a built in dispensing and dosage controlling device 9, and the entire unit 9, 10 is arranged above the oven.

The dispensing and dosage controlling device 9 comprises a hollow cylinder casing 21' in which there is arranged a rotatable drum 22'. The drum 22' is provided with a boring 24 having the shape and the function of a dosage cup, and being provided with an opening 23' for dispensing the granulated material from the dosage cup. In the normal position of the drum 22', the boring 24 is so situated relative to the storage container 10, that the funnel 25 of the storage container 10, is directly above the opening 23' of the boring 24 in the drum 22', and granulated material can thus pass from the storage container into the boring.

By turning the lever 12 by a degree of 180°, the drum 22' is turned and brought into the dispensing position in which the opening 23' of the boring 24 is positioned above the cup 18 and the granulated material contained in the boring 24—which serves as the dosage cup—falls into the empty cup 18 in the heating apparatus.

The dosage of granulated material dispensed to the heating device can be varied by means of the adjustable bottom plate 26 of the boring 24 of the drum 22' in the dispensing device 9 and the adjusting screw 27. By turning the screw 27 the bottom plate 26 can be raised or lowered and thereby the volume of the boring 24 serves as the dosage cup of the dispensing device is changed accordingly. Consequently, the amount of granulated material received by the boring 24 and dispensed to the heating device can be varied at will by turning the adjustable screw 27.

The lever 12 is in direct mechanical communication with both the storage and dispensing unit 9, 10 on the one hand and the oven 6 containing the assembly of cups on the other hand. The communication of the lever 12 with the oven 6 is effected by the intermediate lever 13 and the guide rail 11, the latter being connected with the oven 6 via transverse parallel connecting rods 16 and 17.

The apparatus of the present invention for dispensing and refilling granulated material operates in the following manner:

An empty cup 18 is placed into the oven on top of the other cup stacked therein. By turning the lever 12 by a degree of 180°, the dosage cup 24 of the dispensing device 9 is emptied and the granulated material falls into the cup 18. The movement of the lever 12 is simultaneously transferred via the intermediate lever 13 to the guide tube 11 and thus the oven connected to the latter by the connecting rods 16 and 17 is lifted. Thereby the uppermost cup 18 protruding from the upper end of the oven, hits against the end plate 15 of the dispensing device, this end plate constituting an upper abutment, and is pushed into the oven 6. At the same time, the bottom cup 23 in the oven 6, which cup contains the granulated mass that has been sufficiently heated by the stream of hot gas passing through the oven, is pushed out of the latter and is supported on the sealing means 5 which constitutes a lower abutment. This cup is thus released for further processing of the heated granulated material.

It will be understood that this invention is susceptible to modification in order to adapt it to different usages and conditions, and, accordingly, it is desired to comprehend such modifications within this invention as may fall within the scope of the appended claims.

What I claim is:

1. In an arrangement incorporating a heating apparatus and dispenser therefor, in combination, a heating apparatus adapted to receive a series of receptacles each of which is adapted to receive a substance to be heated, said heating apparatus being mounted for movement between two positions in one of which an additional receptacle may be so placed into association with the series of receptacles received by said heating apparatus as to form a continuation of such series and in the other of which positions a receptacle which prior to movement of said heating apparatus into such other position was one of the series of receptacles received thereby but which during movement of said heating apparatus into such other position assumes a position exteriorly of said heating apparatus, is freely accessible; dispensing means for supplying a quantity of the substance to be heated into an additional receptacle placed into association with the series of receptacles received by said heating apparatus so as to form a continuation of such series; and common operating means connected to said heating apparatus and to said dispensing means for moving said heating apparatus between said positions thereof as well as for operating said dispensing means.

2. In an arrangement incorporating a heating apparatus and dispenser therefor, in combination, a tubular oven adapted to receive a series of receptacles each of which is adapted to receive a substance to be heated, said oven being mounted for movement in axial direction; a pair of abutments arranged in the path of movement of said oven and spaced from each other a distance at least as great as the axial length of said oven plus the axial length of one of said receptacles, whereby when said oven is near one of said abutments an additional receptacle may be so placed into association with the series of receptacles received by said oven so as to form a continuation of such series and whereby when such additional receptacle is so placed and said oven thereafter moved axially toward the other of said abutments, the receptacle nearest said one abutment assumes a position exteriorly of said oven and may readily be removed; dispensing means located in the region of said other abutment for dispensing a quantity of the substance to be heated into an additional receptacle placed, at such time as said oven is near said one abutment, into association with the series of receptacles received by said oven so as to form a continuation of such series; and common operating means connected to said oven and to said dispensing means for moving said oven between said abutments as well as for operating said dispensing means.

3. In an arrangement incorporating a heating apparatus and dispenser therefor, in combination, a tubular oven adapted to receive a series of receptacles each of which is adapted to receive a substance to be heated, said oven being mounted for movement in axial direction; a pair of abutments arranged in the path of movement of said oven and spaced from each other a distance at least as great as the axial length of said oven plus the axial length of one of said receptacles, whereby when said oven is near one of said abutments an additional receptacle may be so placed into association with the series of receptacles received by said oven so as to form a continuation of such series and whereby when such additional receptacle is so placed and said oven thereafter moved axially toward the other of said abutments, the receptacle nearest said one abutment assumes a position exteriorly of said oven and may readily be removed; dispensing means located in the region of said other abutment and movable between open and closed positions for dispensing a quantity of the substance to be heated into an additional receptacle placed, at such time as said oven is near said one abutment, into association with the series of receptacles received by said oven so as to form a continuation of such series; and common operating means connected to said oven and to said dispensing means for moving said oven between said abutments as well as for operating said dispensing means in such a manner that when said oven is near said one abutment said dispensing means is closed and that when said oven is near said other abutment said dispensing means is open.

4. In an arrangement incorporating a heating apparatus and dispenser therefor, in combination, a substantially vertical tubular oven adapted to receive a stack of receptacles each of which is adapted to receive a substance to be heated, said oven being mounted for movement in axial direction; a pair of upper and lower abutments arranged in the path of movement of said oven and spaced from each other a distance at least as great as the height of said oven plus the height of one of said receptacles, whereby when said oven is near said lower abutment an additional receptacle may be placed upon the stack of receptacles received by said oven and whereby when such additional receptacle is so placed and said oven thereafter raised toward said upper abutment, the lowermost of the stack of receptacles assumes a position exteriorly of said oven and may readily be removed; dispensing means located in the region of said upper abutment for dispensing a quantity of the substance to be heated into an additional receptacle placed, at such time as said oven is near said lower abutment, upon the stack of receptacles received by said oven; and common operating means connected to said oven and to said dispensing means for moving said oven between said abutments as well as for operating said dispensing means.

5. In an arrangement incorporating a heating apparatus and dispenser therefor, in combination, a substantially vertical tubular oven adapted to receive a stack of receptacles each of which is adapted to receive a substance to be heated, said oven being mounted for movement in axial direction; a pair of upper and lower abutments arranged in the path of movement of said oven and spaced from each other a distance at least as great as the height of said oven plus the height of one of said receptacles, whereby when said oven is near said lower abutment an additional receptacle may be placed upon the stack of receptacles received by said oven and whereby when such additional receptacle is so placed and said oven thereafter raised toward said upper abutment, the lowermost of the stack of receptacles assumes a position exteriorly of said oven and may rapidly be removed; dispensing means located in the region of said upper abutment and movable between open and closed positions for dispensing a quantity of the substance to be heated into an additional receptacle placed, at such time as said oven is near said lower abutment, upon the stack of receptacles received by said oven; and common operating means connected to said oven and to said dispensing means for moving said oven between said abutments as well as for operating said dispensing means in such a manner that when said oven is near said lower abutment said dispensing means is closed and that when said oven is near said upper abutment said dispensing means is open.

6. The combination defined in claim 5 wherein said upper abutment is formed on said dispensing means.

7. The combination defined in claim 5 wherein said dispensing means include a rotatable dispensing drum, and wherein said common operating means include rotatable actuator means for rotating said drum, reciprocable actuator means for moving said oven in axial direction thereof, and motion-converting means interconnecting said rotatable actuator means and said reciprocable actuator means for converting the motion of one into the motion of the other.

8. The combination defined in claim 5 wherein said dispensing means include a rotatable dispensing drum, and wherein said common operating means include rotatable actuator means for rotating said drum, manually operable means for rotating said rotatable actuator means, reciprocable actuator means for moving said oven in axial direction thereof, and motion-converting means interconnecting said rotatable actuator means and said reciprocable actuator means for converting rotation of the former, under the influence of said manually operable means, to reciprocation of said reciprocable actuator means.

No references cited.